United States Patent
Miller et al.

(10) Patent No.: US 8,815,764 B2
(45) Date of Patent: Aug. 26, 2014

(54) WATER TREATED CATALYST TO PRODUCE LIGHT OLEFINS

(75) Inventors: Raelynn M. Miller, LaGrange, IL (US); John Q. Chen, Glenview, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 575 days.

(21) Appl. No.: 11/848,271

(22) Filed: Aug. 31, 2007

(65) Prior Publication Data

US 2009/0062113 A1 Mar. 5, 2009

(51) Int. Cl.
| | |
|---|---|
| *B01J 27/18* | (2006.01) |
| *B01J 37/00* | (2006.01) |
| *B01J 37/06* | (2006.01) |
| *B01J 29/85* | (2006.01) |

(52) U.S. Cl.
CPC .............. *B01J 29/85* (2013.01); *B01J 37/0045* (2013.01); *B01J 2229/42* (2013.01); *B01J 37/06* (2013.01)
USPC .............................. 502/214; 502/60; 502/208

(58) Field of Classification Search
USPC .................................................. 502/208, 214
See application file for complete search history.

(56) References Cited

U.S. PATENT DOCUMENTS

| | | | |
|---|---|---|---|
| 4,440,871 A | 4/1984 | Lok et al. ....................... 502/214 |
| 5,248,647 A | 9/1993 | Barger ........................... 502/214 |
| 6,153,522 A * | 11/2000 | Takagi et al. .................. 438/687 |
| 6,440,894 B1 | 8/2002 | Martens et al. ................ 502/214 |
| 6,685,905 B2 | 2/2004 | Mertens et al. ................ 423/306 |
| 6,710,008 B2 | 3/2004 | Chang et al. ................... 502/214 |
| 6,812,373 B2 | 11/2004 | Wang ............................ 585/638 |
| 6,936,566 B2 | 8/2005 | Mees et al. .................... 502/214 |
| 6,953,767 B2 | 10/2005 | Janssen et al. ................ 502/214 |
| 7,015,174 B2 | 3/2006 | Loezos et al. ................. 502/214 |
| 7,026,267 B2 | 4/2006 | Chang et al. ................... 502/214 |
| 2005/0075525 A1* | 4/2005 | Chang et al. ................... 585/639 |
| 2005/0101478 A1* | 5/2005 | Janssen et al. ................ 502/214 |
| 2006/0224032 A1* | 10/2006 | Janssen ......................... 585/639 |
| 2007/0004951 A1* | 1/2007 | Chen ............................. 585/639 |
| 2007/0032378 A1 | 2/2007 | Karch et al. ................... 502/208 |

OTHER PUBLICATIONS

Minchev et al., "Effect of the rehydration on the acidity and catalytic activity of SAPO molecular sieves", Catalysis Letters 18 (1993) 125-135.

Briend et al., "Influence of the Choice of the Template on the Short- and Long-Term Stability of SAPO-34 Zeolite", J. Phys. Chem. 1995, 99, 8270-8276.

* cited by examiner

*Primary Examiner* — Melvin C Mayes
(74) *Attorney, Agent, or Firm* — Mark Goldberg

(57) ABSTRACT

A process is presented for the formation of a SAPO-34 catalyst product. The process, that involves treatment with water or optionally at least one dissolved solid selected from the group consisting of ammonium chloride, ammonium phosphate, ammonium sulfate, ammonium acetate, ammonium carbonate, ammonium nitrate and mixtures thereof creates a SAPO-34 catalyst that has an increased selectivity for production of ethylene and propylene.

4 Claims, No Drawings

WATER TREATED CATALYST TO PRODUCE LIGHT OLEFINS

FIELD OF THE INVENTION

The present invention relates to a process for producing a catalyst for converting oxygenates to olefins. The process produces a catalyst with greater product selectivity through treatment of the catalyst with water.

BACKGROUND OF THE INVENTION

Light olefins are an important basic chemical feedstock for the production of many plastics used in a variety of industries. Olefins are most commonly produced from petroleum feedstocks through the cracking of larger hydrocarbon molecules. The cracking process is either a catalytic or steam cracking process, and produces light olefins which consist primarily of ethylene and propylene.

An alternate source of light olefins is from the conversion of oxygenates to olefins. The primary oxygenate that is converted to an olefin is methanol. The preferred process is generally referred to as methanol-to-olefins (MTO) process. The primary olefins produced from this process are ethylene and propylene, and the process is performed over a catalytic molecular sieve. The MTO process enables an important alternative to petroleum sources of feeds for the production of light olefins. The sources of oxygenates include alcohols, such as methanol and ethanol; ethers, such as dimethyl ether and diethyl ether; and other oxygenates, such as methyl formate and dimethyl carbonate. These oxygenates can be produced from natural gas, fermentation of biomass, municipal wastes, and recycled organic materials. An important commercial consideration is that methanol can be readily produced from natural gas, or coal, and is easier and safer to handle and transport than either natural gas or coal.

There are numerous patents describing improved preparation of molecular sieves. U.S. Pat. No. 5,248,647 describes the hydrothermal treatment of silicoaluminophosphates molecular sieves at temperatures in excess of about 700° C. for periods sufficient to destroy a large proportion of their acid sites while retaining at least 80% of their crystallinity to form a catalyst for converting methanol to lower olefins. This catalyst shows increased catalyst life, increased selectivity for $C_2$ to $C_3$ olefins and decreased selectivity for paraffin production relative to the untreated molecular sieve. In U.S. Pat. No. 6,440,894, halogens are removed by steam-treating the catalyst at a temperature from 400° to 1000° C. The type of molecular sieve or catalyst, composition, size, and processing conditions affect the process of producing a high yield of light olefin and requires significant experimentation without providing guidance for specific molecular sieves.

The prior art teaches that catalyst exposure to water results in deactivation of the catalyst. For example, in U.S. Pat. No. 7,015,174, there is a lengthy explanation of the deactivation of the catalyst that is caused by exposure to water. Contrary to that patent's teachings, in the present invention it has been found that a treatment with water results in a catalyst that has an enhanced selectivity for the desired light olefins.

It is highly desirable to increase the yield of the desired light olefins—ethylene and propylene. Accordingly, it would be useful to produce a catalyst that produces a higher yield of these desired products.

SUMMARY OF THE INVENTION

The present invention provides a catalyst that has been treated with water to improve the selectivity in production of the desired light olefins. The catalyst is for use in the MTO process in an environment that is physically damaging to the catalyst. The catalyst comprises a molecular sieve which is crystallized from a reaction mixture comprising aluminum, phosphorus, a metal, water, and an organic template. After crystallization, the molecular sieve is washed, then the washed molecular sieve is mixed with a sodium silicate and an acid alum to form a catalyst slurry. The catalyst slurry is spray dried to form hard particles of the catalyst.

Additional objects, embodiments and details of this invention can be obtained from the following detailed description of the invention.

DETAILED DESCRIPTION OF THE INVENTION

The SAPO-34 molecular sieve belongs to the family of molecular sieves having the structure type of the zeolitic mineral chabazite (CHA). The preparation and characterization of SAPO-34 is known in the art, as exemplified in U.S. Pat. No. 4,440,871; U.S. Pat. No. 5,248,647 and U.S. Pat. No. 6,953,767, which are incorporated by reference in their entireties.

The preparation of a SAPO-34 molecular sieve comprises providing a reaction mixture including aluminum, phosphorus, water, an organic template and silicon. This preparation is applicable more broadly to ElAPO molecular sieves, where the element, El is chosen to be one or more elements from silicon, magnesium, zinc, iron, cobalt, nickel, manganese and chromium. The resulting catalyst has a chemical composition on an anhydrous basis expressed by an empirical formula of:

$$(El_xAl_yP_z)O_2.$$

The "x" is the mole fraction of El and has a value of at least 0.001, "y" is the mole fraction of Al and has a value of at least 0.01, and "z" is the mole fraction of P and has a value of at least 0.01. The sum of x, y and z equals 1, or x+y+z=1.

Organic templating agents include amines, and quaternary ammonium compounds. Examples of templating agents include, but are not limited to morpholine, tetraethyl ammonium hydroxide (TEAOH), tetraethyl ammonium phosphate, tetraethyl ammonium bromide, tetraethyl ammonium chloride, tetraethyl ammonium fluoride, tetraethyl ammonium acetate, dipropylamine (DPA), isopropylamine, cyclohexylamine, methylbutylamine, diethanolamine, morpholine, diethylethanolamine, N-methylethanolamine, tetramethylammonium hydroxide, sec-butylamine, dimethylethanolamine, N-methyl-butylamine, methyldiethanolamine, 2,2-dimethyl-1,3-propanediamine, cyclohexylamine, triethylamine, N,N,N',N'-tetramethyl-ethylenediamine, diisopropylamine, N-ethyl-butylamine, 2-methyl-1,5-pentanediamine, N,N-dimethylbutylamine, N,N,N',N'-tetramethyl-1,3-butanediamine, N,N,N',N'-tetramethyl-1,4-butanediamine, N,N-dimethylcyclohexylamine, N,N-dimethylbenzylamine, C,C,C-trimethyl-1,6-hexanediamine, N,N,N', N'-tetraethyl-ethylenediamine, 4-piperidino-piperidine, N,N,N',N'-tetraethyl-1,3-propane-diamine, tetrapropylammonium hydroxide, N,N,N',N'-tetraethyl-diethylenetriamine and 1,1'-methylene-bis(3-methylpiperidine).

Crystallization of the reaction mixture at a temperature from 100° to 250° C. produces a molecular sieve. The resulting molecular sieve crystals are then washed. The normal processing of molecular sieve involves drying the molecular sieve. This, however, tends to agglomerate the crystals. It has been found that instead of drying the crystals after formation, harder, more attrition-resistant crystals can be formed through a new process.

After washing the molecular sieve, a slurry with the molecular sieve crystals is formed without drying to maintain a small crystal size, adding a sodium silicate and acid alum to the slurry. The slurry is mixed in a high shear mixer and spray dried, producing small particles of catalyst product that are much harder and more attrition resistant. The mixing time should be short to avoid the binder gelling, and should be between about 10 seconds and about 60 minutes. The time for mixing is subject to the amount of shear provided by the mixer and other operating considerations.

As an alternative, the molecular sieve can remain unwashed using a slurry of unwashed molecular sieve with sodium silicate and acid alum. Spray drying will allow for vaporization of residual organic template. It is believed that the remaining dissolved oxides will contribute to the product strength.

The acid alum is a mixture of aluminum sulfate and sulfuric acid. Sodium silicate is a solution of silica dissolved in a caustic material, with a typical ratio of silica to caustic of about 3:1 by weight. When the acid alum and sodium silicate are mixed, the resulting solution is acidified waterglass. The two solutions are mixed in a ratio that produces a waterglass with a pH from about 2-3.

Additional binders which can be added to the slurry include, but are not limited to, aluminas, silicas, silica-alumina, aluminum phosphate, titania and zirconia. Other inorganic binders are also usable in this process and include for example magnesia, chromia, boria, thoria, and zinc oxides. The binders can also be added as a colloidal sol comprising silica, alumina, or silica-alumina. It should be noted that the term silica-alumina does not mean a physical mixture of silica and alumina but means an acidic and amorphous material that has been cogelled or coprecipitated. In this respect, it is possible to form other cogelled or coprecipitated amorphous materials that will also be effective as binders. These include silica-magnesias, silica-zirconias, silica-thorias, silica-berylias, silica-titanias, silica-alumina-thorias, silica-alumina-zirconias, aluminophosphates, mixtures of these, and the like.

When forming the catalyst product, the molecular sieve has a composition between about 15 and about 50 wt-% of the dried catalyst product. The binder in the catalyst product forms between 10 and about 90 wt-% of the dried catalyst product.

It is preferred to optionally add a clay to the catalyst. The clay is usually added to the catalyst slurry before the mixing of the molecular sieve and binder, and the resultant slurry is mixed and spray dried. When adding clay, the clay forms between about 40 and about 80 wt-% of the dried catalyst product. Clays that are used in this process to form a hardened product include, but are not limited to, kaolin, kaolinite, montmorillonite, saponite, bentonite, attapulgite and halloysite.

Clays contribute strength as a binder enhancing the attrition resistance properties of the catalyst particles, and clays in combination with binders contribute to the hardness of the particles. Clays also start as small particles and have a higher density, such that when combined with the molecular sieve and binder provide for denser particles, imparting the desirable characteristic of higher density.

An attrition-resistant catalyst is important for use in physically demanding environments. Of particular concern are environments such as fluidized beds where the catalyst is continuously tumbled and abrades against other catalyst particles and against the walls of the reactor. The MTO process has such an environment and, therefore, an attrition resistant SAPO-34 catalyst is desired.

In accordance with the present invention, the catalyst was treated with water for a period of time from 1 to 48 hours, preferably for a period of time from about 6 to 36 hours and most preferably from about 10 to 24 hours. The water was at a temperature between about 20° and 180° C., preferably between about 20° and 100° C. and most preferably between about 25° and 60° C. In the example provided herein, the water was at 40° C. Following the water treatment, the catalyst was dried at about 350° C. Optionally, the water can contain at least one dissolved solid selected from the group consisting of ammonium chloride, ammonium phosphate, ammonium sulfate, ammonium acetate, ammonium carbonate, ammonium nitrate and mixtures thereof.

The following example is presented to more fully illustrate embodiments of the invention, and is not intended to limit the scope of the invention as set forth in the appended claims.

EXAMPLE

A SAPO-34 molecular sieve was produced as set forth in examples 2-5 of U.S. Pat. No. 5,126,308, which is incorporated by reference in its entirety. The water treatment study included three SAPO-34 powders with varying $SiO_2$ levels of 3, 5 and 12%. The powders were bound with 9% silica using a colloidal silica (Ludox AS-40), calcined to 650° C. and sized to 250 to 2000 micron range. The samples were then treated with water at a catalyst:water weight ratio 1:5. The samples were treated at 40° C. for 48 hours. Following the treatment, the samples were dried at 350° C. prior to testing.

Samples were tested in an MTO catalyst screening plant. Process conditions were 435° C., 35 kPa (5 psig), 80% methanol/water feed at WHSV of 2.5. An online GC is attached to the plant for product analysis and data is collected every 20 minutes. Selectivity data is reported at 99.0% conversion to methanol and dimethylether. The data is summarized in the following table and shows that the combined ethylene and propylene selectivity improves after the water treatment. In addition, the improvement in selectivity increased with higher silica levels in the SAPO-34 powder.

| Ethylene and Propylene Selectivity Performance Data | | | |
|---|---|---|---|
| | Selectivity at 99% Conversion | | |
| Catalyst Description | $C_2=$ | $C_3=$ | $C_2= + C_3=$ |
| 3 wt-% Si SAPO-34, bound | 50.0 | 34.4 | 84.4 |
| Water treated 3 wt-% Si SAPO-34, bound | 49.9 | 35.0 | 84.9 |
| 5 wt-% Si SAPO-34, bound | 47.7 | 35.3 | 83.0 |
| Water treated 5 wt-% Si SAPO-34, bound | 48.5 | 35.6 | 84.1 |
| 12 wt-% Si SAPO-34, bound | 48.0 | 35.2 | 83.2 |
| Water treated 12 wt-% Si SAPO-34, bound | 49.6 | 35.6 | 85.2 |

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A catalyst for use in the process of converting oxygenates to olefins comprising a molecular sieve having a SAPO-34 composition and structure wherein the catalyst is produced by washing the molecular sieve, mixing a binder with the molecular sieve to produce a catalyst slurry, spray drying and then calcining the catalyst slurry to create a catalyst and treating said catalyst with a composition consisting of water at a temperature between about 20° and 100° C. to improve selectivity of said catalyst compared to a catalyst that has not been treated with said water.

2. The catalyst of claim 1 wherein the catalyst is treated with water for a period of time from 1 to 48 hours.

3. The catalyst of claim 2 wherein said catalyst is treated with water for a period of time from about 6 to 36 hours.

4. The catalyst of claim 1 wherein said temperature is between about 25° and 60° C.

\* \* \* \* \*